United States Patent
Lam et al.

(10) Patent No.: US 7,966,607 B1
(45) Date of Patent: Jun. 21, 2011

(54) METHOD AND APPARATUS FOR MANAGING COMPILED METHODS IN A UNIFIED HEAP

(75) Inventors: Ioi K. Lam, Mountain View, CA (US); Frank N. Yellin, Redwood City, CA (US); Oleg A. Pliss, Santa Clara, CA (US)

(73) Assignee: Oracle America, Inc., Redwood Shores, CA (US)

( * ) Notice: Subject to any disclaimer, the term of this patent is extended or adjusted under 35 U.S.C. 154(b) by 921 days.

(21) Appl. No.: 11/021,148

(22) Filed: Dec. 22, 2004

(51) Int. Cl.
*G06F 9/44* (2006.01)
*G06F 9/445* (2006.01)

(52) U.S. Cl. ............ 717/148; 717/120; 717/153; 718/1; 718/100; 707/813; 707/814; 707/816; 707/817

(58) Field of Classification Search .................... 717/140
See application file for complete search history.

(56) References Cited

U.S. PATENT DOCUMENTS

| | | | |
|---|---|---|---|
| 7,127,709 B2 * | 10/2006 | Demsey et al. | 717/148 |
| 7,155,467 B1 * | 12/2006 | Rohrs | 707/206 |
| 7,167,881 B2 * | 1/2007 | Yasuda et al. | 707/206 |
| 7,181,585 B2 * | 2/2007 | Abrashkevich et al. | 711/170 |
| 7,263,700 B1 * | 8/2007 | Bacon et al. | 718/1 |
| 2001/0049710 A1 * | 12/2001 | Curey et al. | 709/100 |
| 2005/0246402 A1 * | 11/2005 | Wu et al. | 707/205 |

* cited by examiner

*Primary Examiner* — Tuan Q Dam
*Assistant Examiner* — Isaac T Tecklu
(74) *Attorney, Agent, or Firm* — Park, Vaughan, Fleming & Dowler LLP

(57) ABSTRACT

One embodiment of the present invention provides a system that facilitates managing compiled program methods in a unified heap. The system partitions the unified heap into a first area and a second area. This allows the system to store objects other than compiled program methods and temporary compiler data structures in the first area, and to store compiled program methods and temporary compiler data structures in the second area.

12 Claims, 6 Drawing Sheets

US 7,966,607 B1

METHOD AND APPARATUS FOR MANAGING COMPILED METHODS IN A UNIFIED HEAP

BACKGROUND

1. Field of the Invention

The present invention relates to computer memory. More specifically, the present invention relates to a method and an apparatus for managing compiled methods in a unified heap.

2. Related Art

Platform-independent computing systems typically provide dynamic allocation of storage space for objects such as classes, program methods, and compiled program methods plus storage space for the objects allocated by an executing program. An example of a platform-independent computing system is the Java Virtual Machine (JVM). The terms JAVA, JVM, and JAVA VIRTUAL MACHINE are trademarks of SUN Microsystems, Inc. of Santa Clara, Calif.

Some platform-independent virtual machines use several "heaps" for storing different types of objects. For example, one heap may be used for storing compiled methods, and another heap may be used for storing other types of objects. These separate heaps may cause under-utilization of the heap memory—one heap may be full while another heap is still empty. However, because of the division of the heap by storage type, a second heap cannot be used to store items destined for the first heap.

In order to maximize space efficiency, many platform-independent virtual machines use a unified heap, which stores all objects allocated by the platform-independent virtual machine. A problem with unified heaps arises while managing dynamically compiled program methods, which are created on demand and need to be evicted when they are no longer used. If compiled methods are inter-mixed with other objects, the only way to reclaim space used by a compiled method after it is no longer being used is to perform a full garbage collection on the entire heap. This garbage collection operation is time-consuming and can cause an undesirable interruption in the execution of a platform-independent program.

Hence, what is needed is a method and an apparatus which manages compiled methods in a unified heap without the problems cited above.

SUMMARY

One embodiment of the present invention provides a system that facilitates managing compiled program methods in a unified heap. The system partitions the unified heap into a first area and a second area. This allows the system to store objects other than compiled program methods and temporary compiler data structures in the first area, and to store compiled program methods and temporary compiler data structures in the second area.

In a variation of this embodiment, the system receives a program method to compile. In response, the system estimates the size for the compiled program method and the size for the temporary compiler data structures needed to compile the program method. The system then determines if sufficient memory is available in the second area to accommodate the compiled program method and the temporary compiler data structures. If so, the system allocates space in the second area for the compiled program method and the temporary compiler data structures.

In a further variation, if sufficient memory is not available in the second area, the system compacts the second area.

In a further variation, if sufficient memory is not available in the second area, the system first moves the partition between the first area and the second area, and then relocates the compiled program methods in the second area to the new partition boundary.

In a further variation, the system stores compiled program methods at low-addresses of the second area and stores temporary compiler data structures at high-addresses of the second area.

In a further variation, the system discards temporary compiler data structures by adjusting a pointer to the temporary compiler data structures to point to the top of the second area.

In a further variation, if the first area is heavily utilized, the system repartitions the unified heap to provide more memory in the first area.

In a further variation, if the second area is heavily utilized, the system repartitions the unified heap to provide more memory in the second area

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
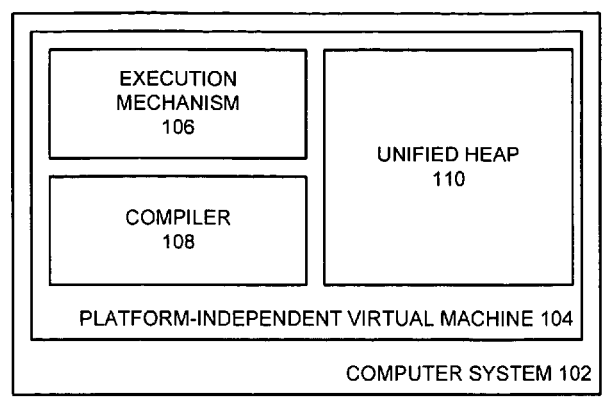
FIG. 1 illustrates a computer system in accordance with an embodiment of the present invention.

FIG. 1 illustrates a computer system 102 in accordance with an embodiment of the present invention. Computer system 102 can generally include any type of computer system, including, but not limited to, a computer system based on a microprocessor, a mainframe computer, a digital signal processor, a portable computing device, a personal organizer, a device controller, and a computational engine within an appliance.

Computer system 102 includes platform-independent virtual machine 104. Platform-independent virtual machine 104 can generally be any platform-independent virtual machine such as a Java Virtual Machine. Platform-independent virtual machine 104 includes, inter alia, execution mechanism 106, compiler 108, and unified heap 110. Execution mechanism 106 executes platform-independent programs that are typically supplied in platform-independent codes, such as Java byte codes. Compiler 108 can be a just-in-time (JIT) compiler for compiling the platform-independent codes into native code associated with the host processor of computer system 102. Typically, frequently executed platform-independent codes are compiled by compiler 108 into native code to speed up program execution.

Unified heap 110 provides storage for dynamically created objects such as program method byte codes, byte-arrays, user objects, compiled program methods, and temporary data structures used by compiler 108. The compiled program methods and the temporary data structures are segregated from other objects unified heap 110 as described below in conjunction with FIG. 2.

Unified Heap

Figure 2:
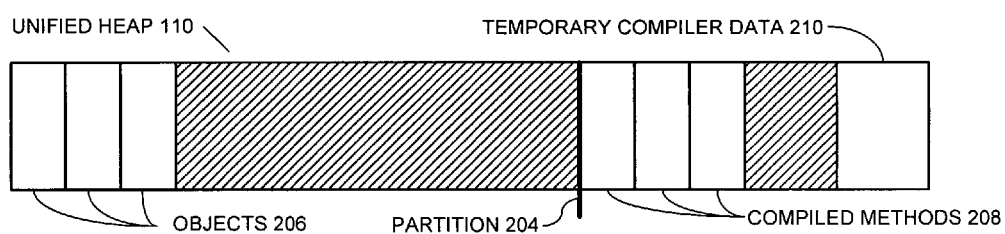
FIG. 2 illustrates a unified heap in accordance with an embodiment of the present invention.

FIG. 2 illustrates a unified heap 110 in accordance with an embodiment of the present invention. Unified heap 110 includes partition 204, which separates compiled methods 208 and temporary compiler data 210 from objects 206. Objects 206 can include uncompiled methods, classes, user objects, and other objects except compiled methods 208 and temporary compiler data 210. During operation, partition 204 can be moved to relieve stress on either side of partition 204 caused by heavy utilization. Note that compiled methods 208 are stored at the low addresses of the upper portion of unified heap 110 and temporary compiler data 210 is stored at the high addresses. This arrangement allows the temporary compiler data 210 to be discarded by simply adjusting a pointer to point to the top of the upper portion of unified heap 110.

Allocating Space for Compiled Methods

Figure 3:
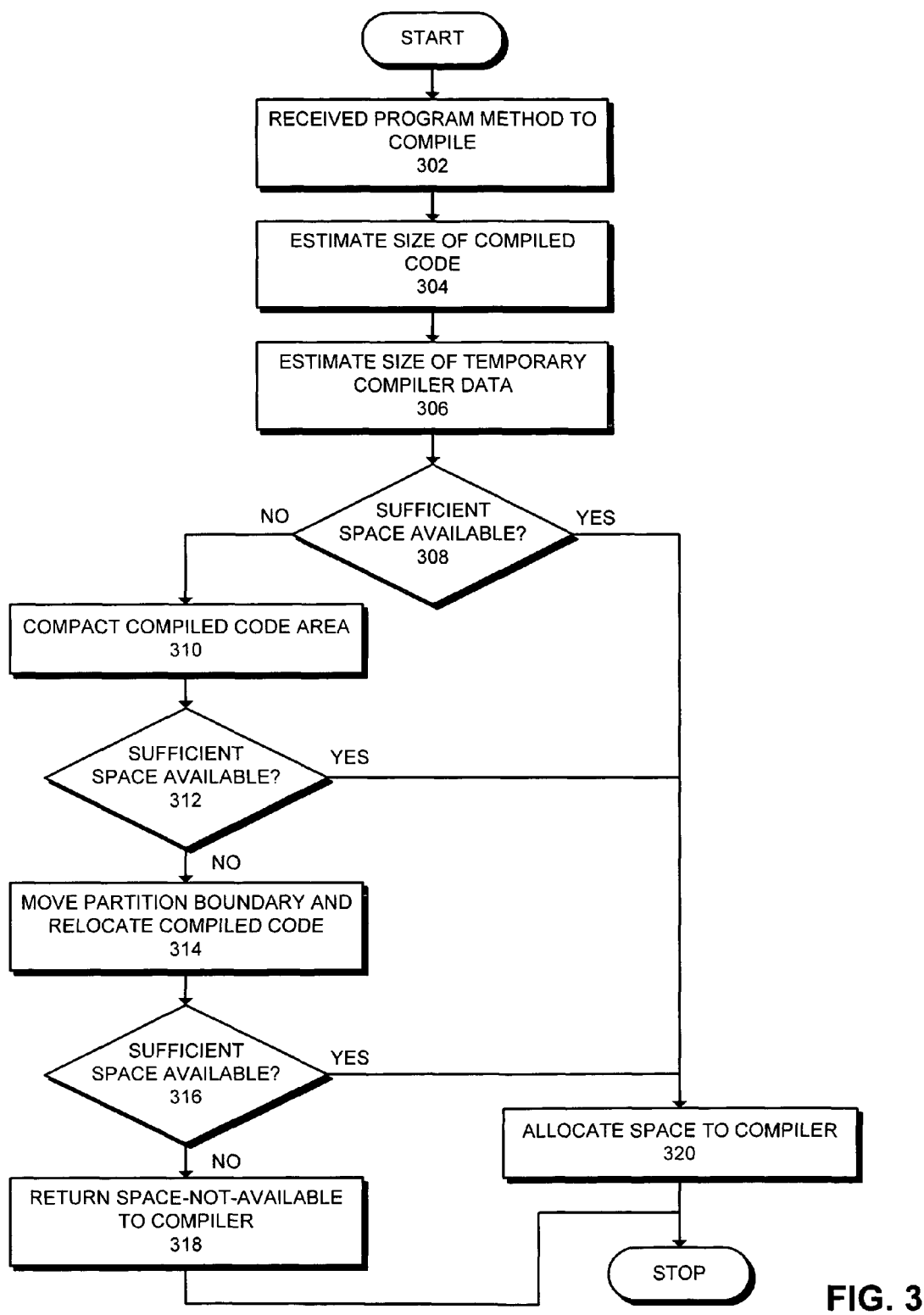
FIG. 3 presents a flowchart illustrating the process of allocating space for a compiled program method in accordance with an embodiment of the present invention.

FIG. 3 presents a flowchart illustrating the process of allocating space for a compiled program method in accordance with an embodiment of the present invention. The system starts when a program method is received to compile (step 302). Next, the system estimates the size of the compiled code (step 304) and the size of the temporary compiler data used to compile the program method (step 306).

Next, the system determines if there is sufficient space available to contain the compiled code and the temporary compiler data (step 308). If not, the system compacts the compiled code area (step 310). The process of compacting the compiled code area is described in detail in conjunction with FIGS. 7A and 7B below. After compacting the compiled code area, the system again determines if sufficient space is available (step 312).

If sufficient space is still not available, the system moves the partition boundary and relocates the compiled code (step 314). Relocating the compiled code is described in detail in conjunction with FIG. 6 below. After relocating the compiled code, the system again determines if sufficient space is available (step 316). If not, the system returns "space-not-available" to the compiler (step 318). If sufficient space is available at steps 308, 312, or 316, the system allocates the space to the compiler (step 320).

Allocating Space for Temporary Data

Figure 4:
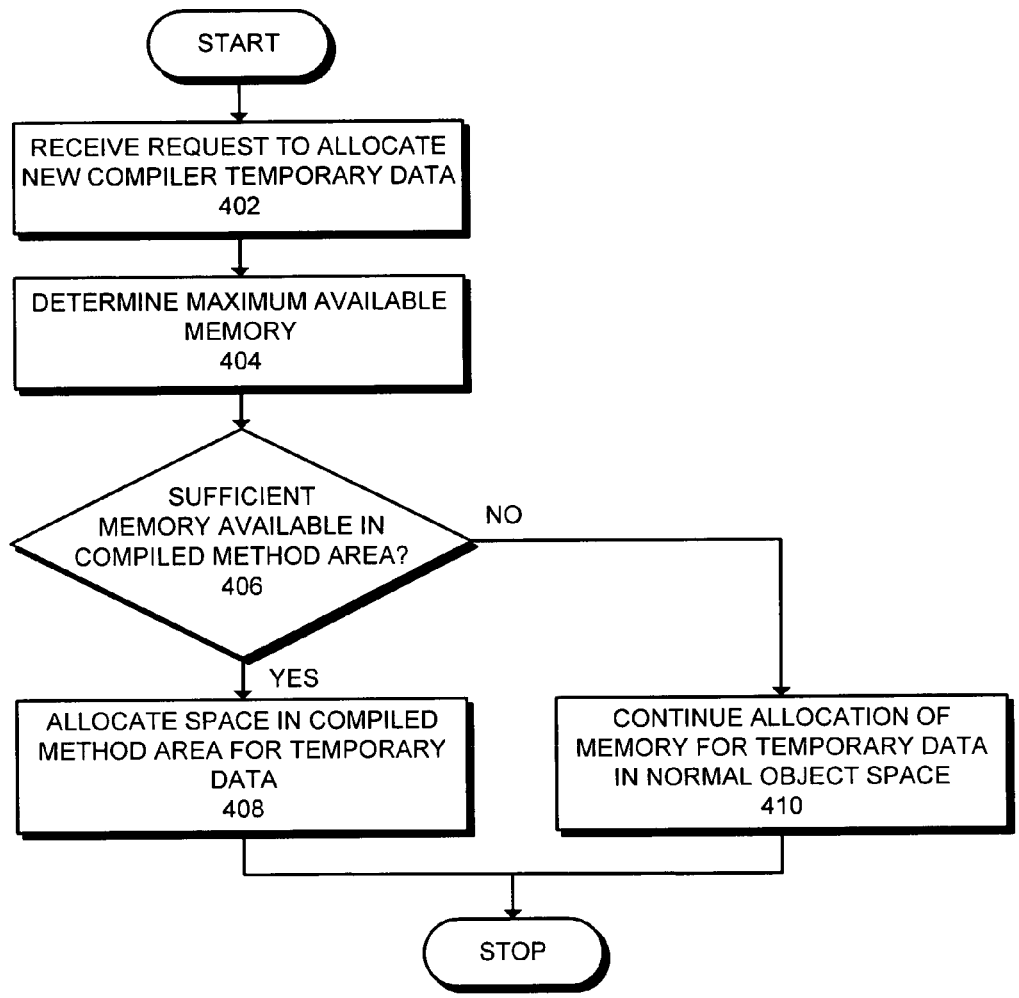
FIG. 4 presents a flowchart illustrating the process of allocating space for temporary data in accordance with an embodiment of the present invention.

FIG. 4 presents a flowchart illustrating the process of allocating space for temporary data in accordance with an embodiment of the present invention. The system starts when a request is received to allocate new compiler temporary data (step 402). Next, the system determines the maximum memory available in the compiled method area for storing the new compiler temporary data (step 404). The system then determines if sufficient memory is available in the compiled method area (step 406).

If sufficient memory is available in the compiled method area, the system allocates space in the compiled method area for the new compiler temporary data (step 408). Otherwise, the system continues the allocation of memory for the new compiler temporary data at the top of the normal object space—the space to the left of partition 204 (step 410).

Discarding Temporary Compiler Storage

Figure 5:
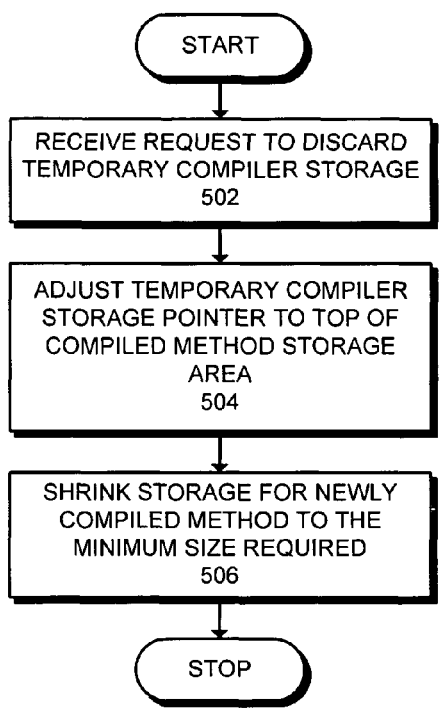
FIG. 5 presents a flowchart illustrating the process of discarding temporary compiler storage in accordance with an embodiment of the present invention.

FIG. 5 presents a flowchart illustrating the process of discarding temporary compiler storage in accordance with an embodiment of the present invention. The system starts when a request is received to discard the temporary compiler storage (step 502). In response, the system adjusts the temporary compiler storage pointer to point to the top of the compiled method storage area (step 504). This effectively discards the temporary compiler data. The system additionally adjusts the size of the newly compiled program method to the minimum size required (step 506).

Relocating the Compiled Program Methods

Figure 6:
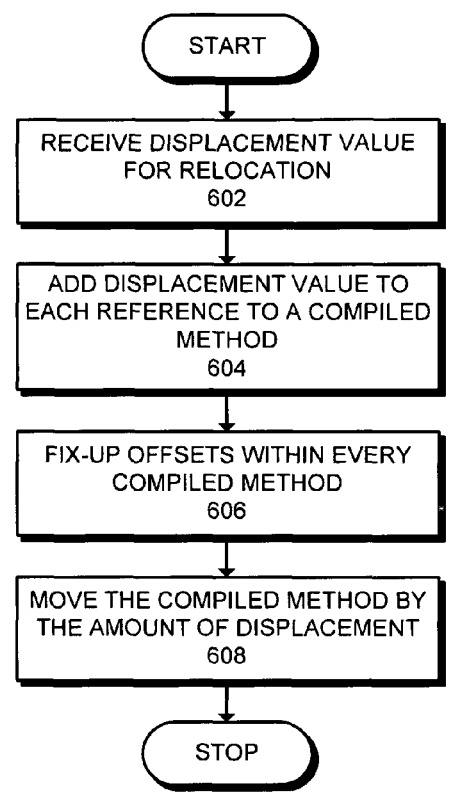
FIG. 6 presents a flowchart illustrating the process of relocating the area reserved for compiled program methods in accordance with an embodiment of the present invention.

FIG. 6 presents a flowchart illustrating the process of relocating the area reserved for compiled program methods in accordance with an embodiment of the present invention. The system starts when a displacement value is received for the relocation (step 602). Note that the displacement value can be positive or negative depending on which way the partition is being moved. Next, the system adds the displacement value to each reference to a compiled method (step 604). These references are typically found in uncompiled methods, stack frames, handles, and in the compiled code cache.

Next, the system performs a fix-up of position dependent offset within every compiled method (step 606). Finally, the system moves the compiled methods by the amount of the displacement (step 608). Note that this move must take into account the direction of the move so that the moved data is not overwritten during the move. If the compiled methods are being moved to lower addresses, the lower addresses must be moved first, while if the compiled methods are being moved to higher addresses, the higher addresses must be moved first.

Compacting the Memory Reserved for the Compiled Program Methods

Figure 7A:
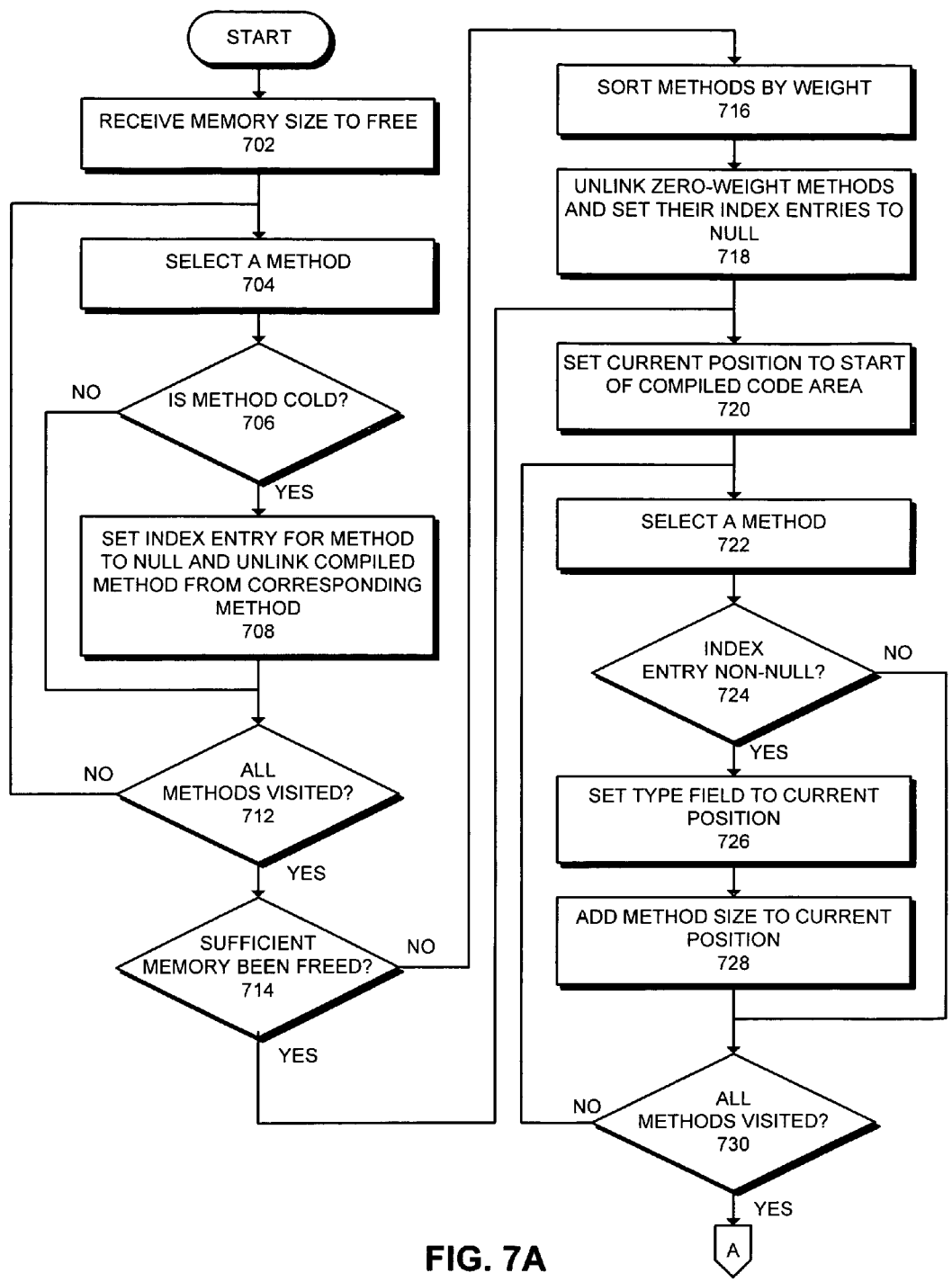
FIG. 7A presents a first portion of a flowchart illustrating the process of compacting the area reserved for compiled program methods in accordance with an embodiment of the present invention.

FIG. 7A presents a first portion of a flowchart illustrating the process of compacting the area reserved for compiled program methods in accordance with an embodiment of the present invention. The system starts when a memory size to free is received (step 702).

At the start of a loop, the system selects a compiled program method to examine (step 704). Next, the system determines if the method is cold (being used infrequently) (step 706). If so, the system sets the index entry for the compiled program method to NULL and unlinks the compiled program method from the uncompiled program method (step 708).

After unlinking the compiled program method or if the compile program method is not cold at step 706, the system determines if all compiled program methods have been visited (step 712). If not, the process returns to step 704 to select another compiled program method.

After all compiled program methods have been visited, the system determines if sufficient memory has been freed (step 714). If not, the system sorts the compiled program methods by weight (step 716). This weight can be derived from a number of factors and provides an indication of the usefulness of the compiled program methods. Next, the system unlinks zero-weight program methods and sets their index entries to NULL (step 718). After the system unlinks zero-weight program methods and sets their index entries to NULL or if sufficient memory has been freed at step 714, the system sets a current position variable to the start of the compiled code area (step 720).

At the start of a loop, the system selects a compiled program method to inspect (step 722). The system then determines if the index entry for the selected program method is not set to NULL (step 724). If the index entry is not set to NULL (the selected program method is not being deleted), the system sets the type field in the selected method to the value in the current position variable (step 726) and adds the size of the selected program method to the value of the current position variable (step 728). Next, the system determines if all of the compiled program methods have been visited (step 730). If not, the system returns to step 722 to select another compiled program method. After all compiled program methods have been visited at step 730, the system continues with the steps in FIG. 7B.

Figure 7B:
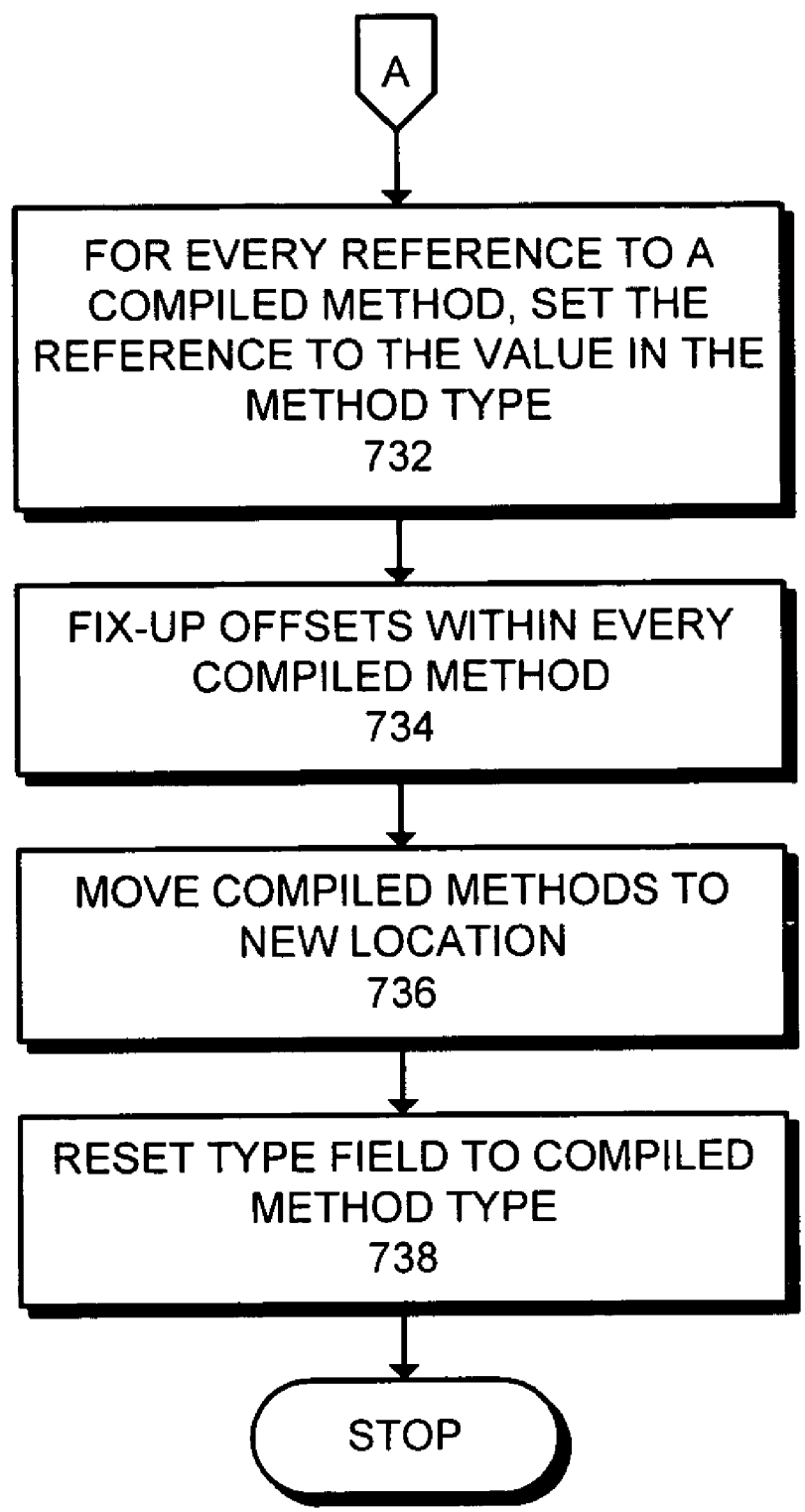
FIG. 7B presents a second portion of the flowchart illustrating the process of compacting the area reserved for compiled program methods in accordance with an embodiment of the present invention.

FIG. 7B presents a second portion of the flowchart illustrating the process of compacting the area reserved for compiled program methods in accordance with an embodiment of the present invention. For every reference to a compiled program method, the system sets the reference to the value stored in the program method's type field (step 732). Next, the system fixes-up the offsets within every compiled program method (step 734). Next, the system moves the compiled program methods to the location specified by the value stored in the compiled program method's type field (step 736). Finally, the system resets the compiled program method's type field to indicate the type of the method (step 738).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

The invention claimed is:

1. A method for managing compiled program methods in a unified heap, comprising:
    partitioning the unified heap into a first area and a second area by using a partition located at a first location between the first area and the second area to define the first area and the second area;
    storing objects other than compiled program methods and temporary compiler data structures in the first area, wherein the objects include at least one of byte arrays, program method byte codes, classes, or user objects;
    storing only compiled program methods and temporary compiler data structures separately in the second area, upon receiving a program method to compile, estimating a size for the compiled program method and a size for the temporary compiler data structures to be used to compile the program method;
    determining if sufficient memory is available in the second area to accommodate the compiled program method and the temporary compiler data structures; and
    if so, allocating space in the second area for the compiled program method and the temporary compiler data structures;
    otherwise, performing at least one of:
        compacting the second area, or
        moving the partition from the first location to a second location between the first area and the second area to increase a size of a partition for the second area, and relocating all the compiled program methods in the second area nearer to the partition location.

2. The method of claim 1, further comprising:
    storing compiled program methods at low-addresses of the second area; and
    storing temporary compiler data structures at high-addresses of the second area.

3. The method of claim 2, further comprising discarding temporary compiler data structures by adjusting a pointer to the temporary compiler data structures to point to the top of the second area.

4. The method of claim 1, wherein if the first area has insufficient memory, the method further comprises repartitioning the unified heap to provide more memory in the first area.

5. The method of claim 1, wherein a pointer denotes the end of the stored temporary compiler data structures in the second portion of the second area.

6. A non-transitory computer-readable storage medium storing instructions that when executed by a computer cause the computer to perform a method for managing compiled program methods in a unified heap, the method comprising:
    partitioning the unified heap into a first area and a second area by using a partition located at a first location between the first area and the second area to define the first area and the second area;
    storing objects other than compiled program methods and temporary compiler data structures in the first area, wherein the objects include at least one of byte arrays, program method byte codes, classes, or user objects;
    storing only compiled program methods and temporary compiler data structures separately in the second area;
    upon receiving a program method to compile, estimating a size for the compiled program method and a size for the temporary compiler data structures to be used to compile the program method; and
    determining if sufficient memory is available in the second area to accommodate the compiled program method and the temporary compiler data structures; and
    if so, allocating space in the second area for the compiled program method and the temporary compiler data structures;
    otherwise, performing at least one of:
        compacting the second area, or
        moving the partition from the first location to a second location between the first area and the second area to increase a size of a partition for the second area, and relocating all the compiled program methods in the second area nearer to the partition location.

7. The computer-readable storage medium of claim 6, wherein the method further comprises:

storing compiled program methods at low-addresses of the second area; and storing temporary compiler data structures at high-addresses of the second area.

8. The computer-readable storage medium of claim 7, wherein the method further comprises discarding temporary compiler data structures by adjusting a pointer to the temporary compiler data structures to point to the top of the second area.

9. The computer-readable storage medium of claim 6, wherein if the first area has insufficient memory, the method further comprises repartitioning the unified heap to provide more memory in the first area.

10. The computer-readable storage medium of claim 6, wherein a pointer denotes the end of the stored temporary compiler data structures in the second portion of the second area.

11. An apparatus for managing compiled program methods in a unified heap, comprising:

a processor;

memory coupled to the processor;

a partitioning mechanism configured to partition the unified heap into a first area and a second area by using a partition located at a first location between the first area and the second area to define the first area and the second area;

a storage mechanism configured to store objects other than compiled program methods and temporary compiler data structures in the first area, wherein the objects include at least one of byte arrays, program method byte codes, classes, or user objects; and wherein the storage mechanism is further configured to store only compiled program methods and temporary compiler data structures separately in the second area, a determining mechanism configured so that upon receiving a program method to compile, the determining mechanism estimates a size for the compiled program method and a size for the temporary compiler data structures to be used to compile the program method, and determines if sufficient memory is available in the second area to accommodate the compiled program method and the temporary compiler data structures; and an allocating mechanism configured so that if sufficient memory is available, the allocating mechanism allocates space in the second area for the compiled program method and the temporary compiler data structures;

an adjusting mechanism configured so that if insufficient memory is available, the adjusting mechanism at least one of:

compacts the second area, or moves the partition from the first location to a second location between the first area and the second area to increase a size of a partition for the second area, and relocates all the compiled program methods in the second area nearer to the partition location.

12. The apparatus of claim 11, wherein a pointer denotes the end of the stored temporary compiler data structures in the second portion of the second area.

* * * * *